United States Patent
Corrado et al.

(10) Patent No.: US 11,687,832 B1
(45) Date of Patent: *Jun. 27, 2023

(54) TRAINING A MODEL USING PARAMETER SERVER SHARDS

(71) Applicant: Google LLC, Mountain View, CA (US)

(72) Inventors: Gregory S. Corrado, San Francisco, CA (US); Kai Chen, San Bruno, CA (US); Jeffrey A. Dean, Palo Alto, CA (US); Samy Bengio, Los Altos, CA (US); Rajat Monga, Sunnyvale, CA (US); Matthieu Devin, Los Altos Hills, CA (US)

(73) Assignee: Google LLC, Mountain View, CA (US)

( * ) Notice: Subject to any disclaimer, the term of this patent is extended or adjusted under 35 U.S.C. 154(b) by 353 days.

This patent is subject to a terminal disclaimer.

(21) Appl. No.: 16/983,979

(22) Filed: Aug. 3, 2020

Related U.S. Application Data

(63) Continuation of application No. 15/665,236, filed on Jul. 31, 2017, now Pat. No. 10,733,535, which is a
(Continued)

(51) Int. Cl.
*G06N 20/00* (2019.01)
*G06N 3/063* (2023.01)
(Continued)

(52) U.S. Cl.
CPC ............ *G06N 20/00* (2019.01); *G06N 3/063* (2013.01); *G06N 3/08* (2013.01); *G06N 7/08* (2013.01);
(Continued)

(58) Field of Classification Search
CPC .......... G06N 20/00; G06N 3/063; G06N 3/08; G06N 7/08; G06N 5/025; G06N 7/005; G06K 9/6256; G06K 9/6269
See application file for complete search history.

(56) References Cited

U.S. PATENT DOCUMENTS

| 8,768,870 B1 | 7/2014 | Corrado et al. |
| 9,218,573 B1 | 12/2015 | Corrado et al. |

(Continued)

OTHER PUBLICATIONS

Making Deep Belief Networks Effective for Large Vocabulary Continuous Speech Recognition Sainath et al. (Year: 2012).*
(Continued)

*Primary Examiner* — Kakali Chaki
*Assistant Examiner* — Ababacar Seck
(74) *Attorney, Agent, or Firm* — Fish & Richardson P.C.

(57) ABSTRACT

Methods, systems, and apparatus, including computer programs encoded on computer storage media, for training a model using parameter server shards. One of the methods includes receiving, at a parameter server shard configured to maintain values of a disjoint partition of the parameters of the model, a succession of respective requests for parameter values from each of a plurality of replicas of the model; in response to each request, downloading a current value of each requested parameter to the replica from which the request was received; receiving a succession of uploads, each upload including respective delta values for each of the parameters in the partition maintained by the shard; and updating values of the parameters in the partition maintained by the parameter server shard repeatedly based on the uploads of delta values to generate current parameter values.

16 Claims, 4 Drawing Sheets

Related U.S. Application Data continuation of application No. 15/231,534, filed on Aug. 8, 2016, now Pat. No. 9,721,214, which is a continuation of application No. 14/817,745, filed on Aug. 4, 2015, now Pat. No. 9,412,065, which is a continuation of application No. 13/826,327, filed on Mar. 14, 2013, now Pat. No. 9,218,573.

(60) Provisional application No. 61/664,133, filed on Jun. 25, 2012, provisional application No. 61/654,806, filed on Jun. 1, 2012, provisional application No. 61/650,427, filed on May 22, 2012.

(51) Int. Cl.
    *G06N 3/08*     (2023.01)
    *G06N 7/08*     (2006.01)
    *G06N 5/025*     (2023.01)
    *G06F 18/214*     (2023.01)
    *G06F 18/2411*     (2023.01)
    *G06N 7/01*     (2023.01)

(52) U.S. Cl.
    CPC ........ *G06F 18/214* (2023.01); *G06F 18/2411* (2023.01); *G06N 5/025* (2013.01); *G06N 7/01* (2023.01)

(56) References Cited

U.S. PATENT DOCUMENTS

| | | | |
|---|---|---|---|
| 9,412,065 B1 | 8/2016 | Corrado et al. | |
| 2012/0249568 A1* | 10/2012 | Gildfind | G06Q 30/0201 345/581 |
| 2012/0254175 A1* | 10/2012 | Horowitz | G06F 16/278 707/E17.046 |
| 2013/0124466 A1* | 5/2013 | Naidu | G06F 16/27 707/610 |

OTHER PUBLICATIONS

Understanding How Deep Belief Networks Perform Acoustic Modelling Mohamed et al. (Year: 2012).*
Context-Dependent Pre-Trained Deep Neural Networks for Large-Vocabulary Speech Recognition Dahl et al. (Year: 2012).*
Adaptive Subgradient Methods for Online Learning and Stochastic Optimization Duchiet al. (Year: 2010).*
Bengio, et al., "A neural probabilistic language model," Journal of Machine Learning Research, 2003, 3:1137-1155.
Coates, et al., "An analysis of single-layer networks in unsupervised feature learning," AISTATS 14, 2011, 215-223.
Collobert and Weston, "A unified architecture for natural language processing: Deep neural networks with multitask learning," ICML, 2008, 160-167.
Dahl et al., "Context-dependent pre-trained deep neural networks for large vocabulary speech recognition," IEEE Transactions on Audio, Speech, and Language Processing, 2012, 20:30-42.
Deng et al., "ImageNet: A Large-Scale Hierarchical Image Database," CVPR, 2009, 248-255.
Duchi et al., "Adaptive Subgradient Methods for Online Learning and Stochastic Optimization," Journal of Machine Learning Research, 2011, 12:2121-2159.
Hinton, et al., "Deep neural networks for acoustic modeling in speech recognition," IEEE Signal Processing Magazine, 2012, 29(6):82-97.
Krizhevsky, "Learning multiple layers of features from tiny images," Advances in Neural Information Processing Systems, 2012, 1106-1114.
Le et al., "On optimization methods for deep learning," ICML, 2011, 265-272.
Martens, "Deep learning via hessian-free optimization," ICML, 2010, 735-742.
Mohamed et al., "Understanding How Deep Belief Networks Perform Acoustic Modelling," IEEE ICASSP, 2012, pp. 4273-4276.
Plagianakos et al., "An Improved Backpropagation Method with Adaptive Learning Rate," Proceeding of the 2nd Intern. Conf. on Circuits, Systems and Computers, 1998.
Raina et al., "Large-scale deep unsupervised learning using graphics processors," ICML, 2009, 9:873-880.
Sainath et al., "Making Deep Belief Networks Effective for Large Vocabulary Continuous Speech Recognition," IEEE ASRU, 2011, pp. 30-35.
Shi et al., "Harsh kernels," Journal of Machine Learning Research, 10:2615-2637.

* cited by examiner

TRAINING A MODEL USING PARAMETER SERVER SHARDS

CROSS-REFERENCE TO RELATED APPLICATIONS

This is a continuation application of U.S. application Ser. No. 15/665,236, filed on Jul. 31, 2017, which is a continuation application of U.S. application Ser. No. 15/231,534, filed on Aug. 8, 2016 (now U.S. Pat. No. 9,721,214), which is a continuation application of U.S. application Ser. No. 14/817,745, filed on Aug. 4, 2015 (now U.S. Pat. No. 9,412,065), which is a continuation application of U.S. application Ser. No. 13/826,327, filed on Mar. 14, 2013 (now U.S. Pat. No. 9,218,573), which claims the benefit of priority under 35 U.S.C. § 119(e) of U.S. Provisional Application No. 61/654,806, filed on Jun. 1, 2012; U.S. Provisional Application No. 61/664,133, filed on Jun. 25, 2012; and U.S. Provisional Application No. 61/650,427, filed on May 22, 2012. The disclosures of the prior applications are considered part of and are incorporated by reference in the disclosure of this application.

BACKGROUND

This specification relates to training machine learning models.

Machine learning models can be trained using a stochastic gradient descent procedure. In stochastic gradient descent, a machine learning model training system operates iteratively to determine values of the model parameters by finding a minimum of an objective function of parameters of the model.

SUMMARY

In general, a system trains a model having parameters through machine learning by determining a respective parameter value for each of the parameters of the model. The system includes multiple parameter server shards, with each shard being configured to maintain values of a respective disjoint partition of the parameters of the model. Each shard operates asynchronously with respect to every other shard. Each shard can receive a succession of respective requests for parameter values from each of multiple replicas of the model. Each of the replicas is an identical instance of the model with possibly different parameter values for the parameters of the model. In response to each request, the shard can download a current value of each requested parameter to the replica from which the request was received. The replica can receive a succession of uploads, each upload including respective delta values for each of the parameters in the partition maintained by the shard and can update values of the parameters in the partition maintained by the parameter server shard repeatedly based on the uploads of delta values to generate current parameter values.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Particular embodiments of the subject matter described in this specification can be implemented so as to realize one or more of the following advantages. Machine learning models with large numbers of parameters can be trained efficiently and effectively. Machine learning models can be trained efficiently and effectively on very large data sets. Machine learning models with multiple levels of non-linear operations, e.g., deep networks, can be trained efficiently and effectively. The rate of network traffic across any particular data link during the training of such a machine learning model can be limited. Because model replicas operate asynchronously, problems caused by hardware failures and slow processing speeds are mitigated.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
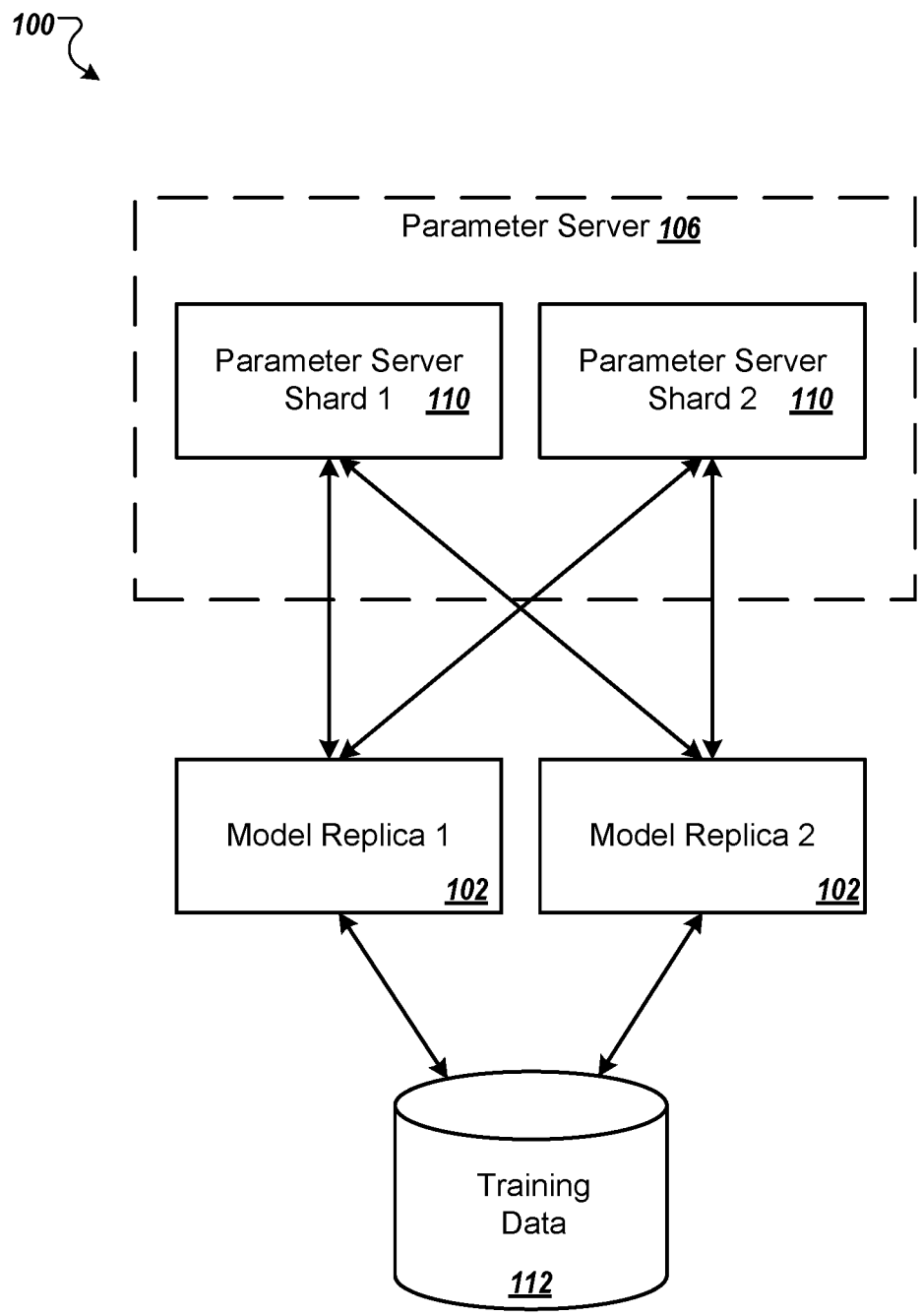
FIG. 1 is a block diagram of an example system for training a machine learning model.

FIG. 1 is a block diagram of an example system 100 for training a machine learning model. The machine learning model receives input and generates an output based on the received input and on values of the parameters of the model. For example, machine learning models may receive data identifying features of an online advertisement and, based on the features of the online advertisement and on the parameters of the model, may generate a prediction as to whether a user will click on the advertisement. The machine learning model may be composed of, e.g., a single level of linear or non-linear operations or may be a deep network, i.e., a machine learning model that is composed of multiple levels of non-linear operations. An example of a deep network is a neural network with one or more hidden layers.

The model can be trained using training data, i.e., the training data in training data database 112. The training data in the training data database 112 are inputs for which the desired output, i.e., the output that should be generated by the model, is known. In order to train the model, i.e., find optimal values of the model parameters, an objective function is developed that is a measure of the performance of the model on the set of training data as a function of the model parameters. The optimal values of the parameters of the model can then be found by finding a minimum of the objective function. In particular, multiple iterations of a stochastic gradient descent procedure can then be performed to find the optimal values of the parameters.

The example system 100 includes multiple model replicas 102. Each of the model replicas 102 is an identical instance of a machine learning model and can be implemented as one or more computer programs and data deployed to be executed on a computing unit. Advantageously, the computing units are configured so that they can operate independently of each other. In some implementations, only partial independence of operation is achieved, for example, because replica instances share some resources.

A computing unit may be, e.g., a computer, a core within a computer having multiple cores, or other hardware or software within a computer capable of independently performing the computation for the model replica. Each model replica 102 operates independently from each of the other model replicas 102 and is configured to communicate with the training data database 112 and a parameter server 106 through a network, e.g., a local area network (LAN) or wide area network (WAN), e.g., the Internet, in order to compute delta values for the parameters of the model. A delta value for a parameter is a value that the replica has determined is to be applied to the current value of the parameter so that it approaches its optimal value.

The parameter server 106 maintains the current values of the parameters of the model and updates the values as the results of training are uploaded by the replicas. The functionality of the parameter server 106 is partitioned among multiple parameter server shards 110. That is, each of the parameter server shards 110 maintains values of a respective subset of the parameters of the model, such that the parameters of the model are partitioned among the parameter server shards 110. Each parameter server shard 110 is implemented on a respective independent computing unit. Advantageously, the computing units are configured so that they can operate independently of each other. In some implementations, only partial independence of operation is achieved, for example, because replica instances share some resources.

Each of the parameter server shards 110 provides values of parameters to the model replicas 102, receives delta values of the parameters from the model replicas 102, and updates stored values of the parameters based on the received delta values independently from each other parameter server shard. Training the machine learning model is described in more detail below with reference to FIGS. 2-4.

Figure 2:
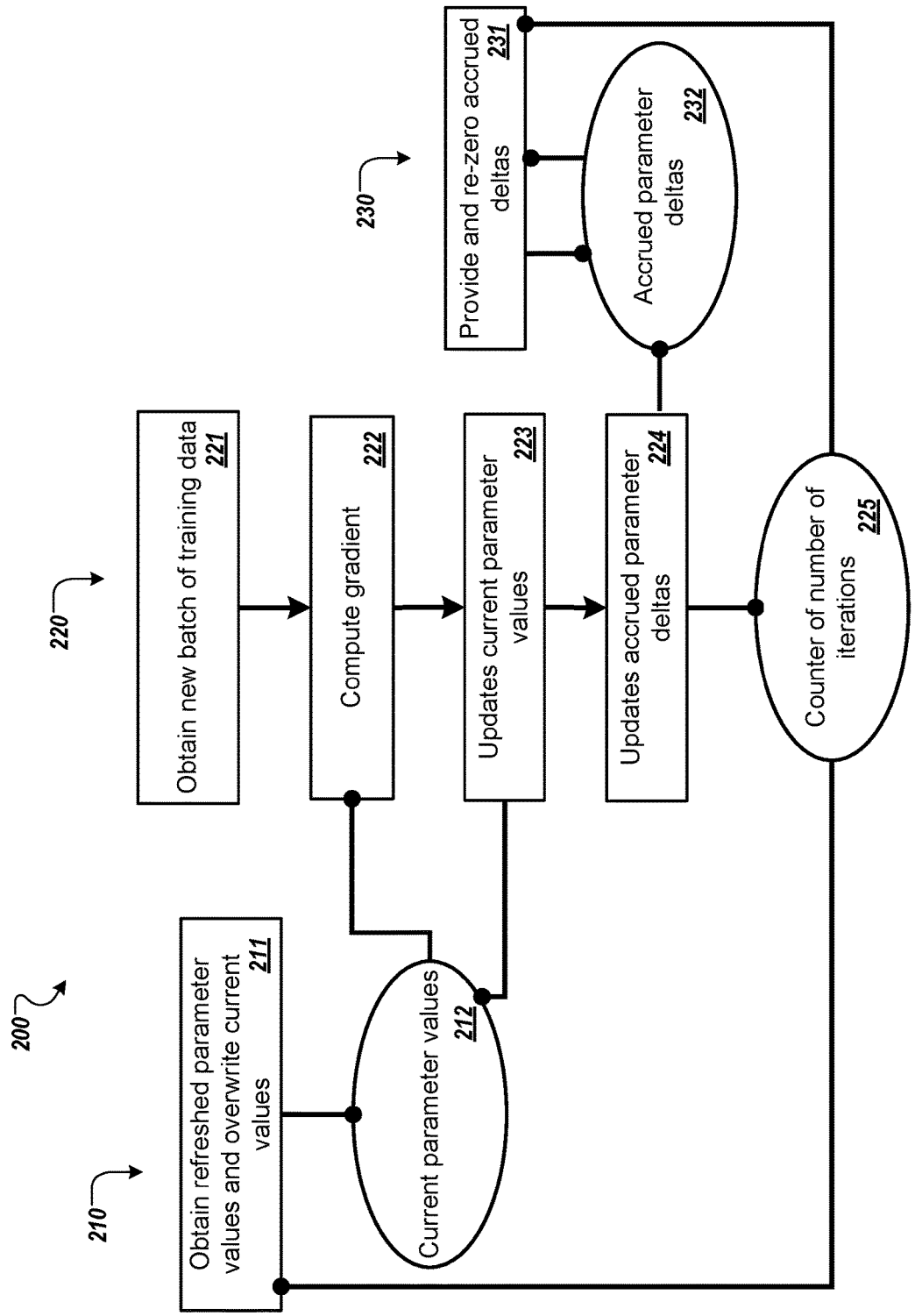
FIG. 2 is a flow diagram of example aspects of an example process for training a machine learning model.

FIG. 2 is a flow diagram of example aspects 210, 220, and 230 of an example process 200 for training a machine learning model. For convenience, the process 200 will be described as being performed by a model replica, e.g., one of the model replicas 102 of FIG. 1.

The process 200 can advantageously be performed asynchronously by multiple replicas of the same machine learning model, e.g., model replicas 102 of FIG. 1, as part of a procedure for training the machine learning model. As part of the training procedure, each of the model replicas may perform the process 200 multiple times. For example, each model replica may repeat the process until a termination condition is reached or the training is terminated, by a system administrator, for example.

In FIG. 2, steps of the example process 200 are represented by boxes, with arrows having pointed connectors showing the flow between the steps of the process 200. Data that is shared between the aspects 210, 220, and 230 of the process 200 is represented by ovals, with reading from or writing to from the shared data by the replica being represented by arrows with rounded connectors.

The process 200 includes a parameter updating aspect 210, a delta value computing aspect 220, and a delta value providing aspect 230. Each of the aspects 210, 220, and 230 may be performed by the replica in parallel, e.g., each aspect can be performed by a separate thread of execution.

As part of the parameter updating aspect 210, the replica obtains refreshed parameter values (step 211) and overwrites current values of the parameters (data 212). The replica obtains the refreshed value of a parameter by submitting a request to the parameter server shard that maintains the values of the parameter. The replica can determine which of the parameter server shards maintains a given parameter by using a deterministic function that maps parameter identifiers to the parameter server shards that maintain values of the parameters identified by the identifiers. For example, the deterministic function can be the modulus operator, where the modulus is the number of shards, and the shards are numbered consecutively starting from zero.

Depending on the model being trained, refreshed values of each parameter may not be necessary to perform particular steps of the training process. For example, for models that are sparse, a replica may only need to use values of a subset of the parameters of the model to compute delta values for each parameter of the model. For example, a model that takes as input one or more text-based features, e.g., the words in an English-language Internet search query, may only need to request and update the parameters associated with the words that appear in search queries identified in the obtained batch of training data rather than parameters associated with every word in the English language. In these cases, the replica can determine the parameter server shards that maintain values of the necessary parameters, and request values of parameters only from those parameter server shards, i.e., instead of requesting values of unnecessary parameters and communicating with parameter server shards that do not maintain values of parameters not needed by the replica.

As part of the delta value computing aspect 220, the replica performs an iteration of a training procedure to compute delta values for each parameter of the model. In particular, the replica performs an iteration of a stochastic gradient descent procedure.

The system obtains a new batch of training data (step 221). The batch of training data is a subset of the set of training data to be used in training the model, e.g., the training data in training data database 112 of FIG. 1. Each model replica operates on batches of training data in a different sequence. That is, it is unlikely that any two model replicas use the same batch of training data to perform any given iteration of the stochastic gradient descent process. For example, the set of training data to be used in training the model can be partitioned among the model replicas, and each model replica can select training data only from the corresponding partition corresponding to the model replica. Alternatively, each model replica can select batches from the same set of training data, with each model replica selecting batches in a different order than any other model replica. For example, each model replica can use a different random number generating algorithm to identify the batch of training data to be selected. Generally, this will result in each replica using a different subset of the set of training data.

The replica computes a gradient (step 222) of the objective function for the model based on the new batch of training data and on the current values of the parameters (data 212) to determine values for each parameter. In particular, the delta values ($\Delta p_i$) can be expressed as:

$$\Delta p_i = \Delta Q(p_i, t),$$

where $\Delta Q(p_i, t)$ is the gradient of the objective function Q of the current values of the parameters and the batch of training data t.

The replica updates (step 223) the current parameter values (data 212) based on the gradients. In particular, the updated values for the parameters ($p_u$) can be expressed as:

$$p_u = p_c - \alpha \times \Delta p_c,$$

where $p_c$ are the current values for the parameters as known by the replica, α is a learning rate for the machine learning model, and the $\Delta p_c$ are the determined delta values. Because aspect 210 and aspect 220 may be performed in parallel, the parameter values used by the replica to compute the gradient may be different from the parameter values that the replica updates, e.g., because the values stored in the data 212 may have been overwritten as part of aspect 210 between the time that the replica began to compute the gradient and the time when the replica updated the current parameter values.

In some implementations, the learning rate a is a pre-determined constant value. In some other implementations, the learning rate is an adaptive learning rate rather than a constant rate. That is, the learning rate may be different for different parameters and, optionally, for any given parameter, the learning rate may vary based on, e.g., the number of iterations of stochastic gradient descent that have been performed, the number of updates to the parameter, the history of previous parameter values of the parameter, the history of gradient values that have been computed during previous iterations of stochastic gradient descent, the history of values of higher order derivatives used during previous iterations, or statistics derived from any of the above. Example adaptive learning rates are described in J. C. Duchi, E. Hazan, and Y. Singer, *Adaptive Subgradient Methods for Online Learning and Stochastic Optimization, Journal of Machine Learning Research,* 12:2121-2159, 2011, and in V. P. Plagianakos, D. G. Sotiropoulos and M. N. Vrahatis, *An Improved Backpropagation Method with Adaptive Learning Rate. Proceeding of the 2nd Intern. Confer. on: Circuits, Systems and Computers,* 1998.

However, because multiple model replicas of the same model operate independently while the model is being trained, at any given time, some model replicas may have performed different numbers of iterations of stochastic gradient descent than other replicas and thus may not be able to compute the current adaptive learning rate accurately. Therefore, in implementations where the learning rate is adaptive, when updating the current values of the parameters, each replica can replace the adaptive learning rate with a fixed learning rate or estimate the adaptive learning rate by executing an adaptive learning rate procedure based on the data available to the replica. Alternatively, each replica can request the current values of the adaptive learning rates from parameter server shards, e.g., when requesting the refreshed parameter values, and use the values of the adaptive learning rates obtained from the parameter server shards when updating the current parameter values.

The replica updates (step 224) accrued parameter delta values (data 232) based on the gradients. The accrued parameter delta values are values that have been accrued since the replica last provided delta values of parameters to the parameter server shards. For example, the system can update the accrued values by adding the currently computed delta values to the accrued values.

Once the replica has updated the accrued parameter delta values, the replica determines whether to initialize the updating aspect 210 or the delta value providing aspect 230. For example, the replica can update a counter of the number of iterations of the training process that have been performed (data 225). If the updated value of the counter is a multiple of a first pre-determined value, the replica can begin an instance of the updating aspect 210. If the counter is a multiple of a second pre-determined value, the replica can begin an instance of the delta value providing aspect 230. The first and second pre-determined values can be specified, e.g., by a system administrator. Depending on the implementation, the first and second values can be the same or different values and one or both of the values can be greater than one. If the first value is equal to one, i.e., the replica obtains refreshed parameter values after each iteration of the training process, the replica may refrain from updating the current parameter values, i.e., from performing step 223 of the delta value computing aspect 220. Similarly, if the second value is equal to one, i.e., the replica provides delta values after each iteration of the training process, the system may refrain from storing accrued delta values locally and may instead provide the delta values computed during the current iteration to the parameter server shards and then discard the provided delta values.

If the aspect 230 is to be performed, the replica provides the accrued delta value for each parameter stored in data 232 to the parameter server shard that maintains the parameter and then re-zeroes the values of the parameters stored in the data 232 (step 231).

Additionally, e.g., if a termination condition has not been reached, after the replica has updated the accrued parameter delta values, the replica can return to step 221, i.e., obtain a new batch of training data for processing.

Figure 3:
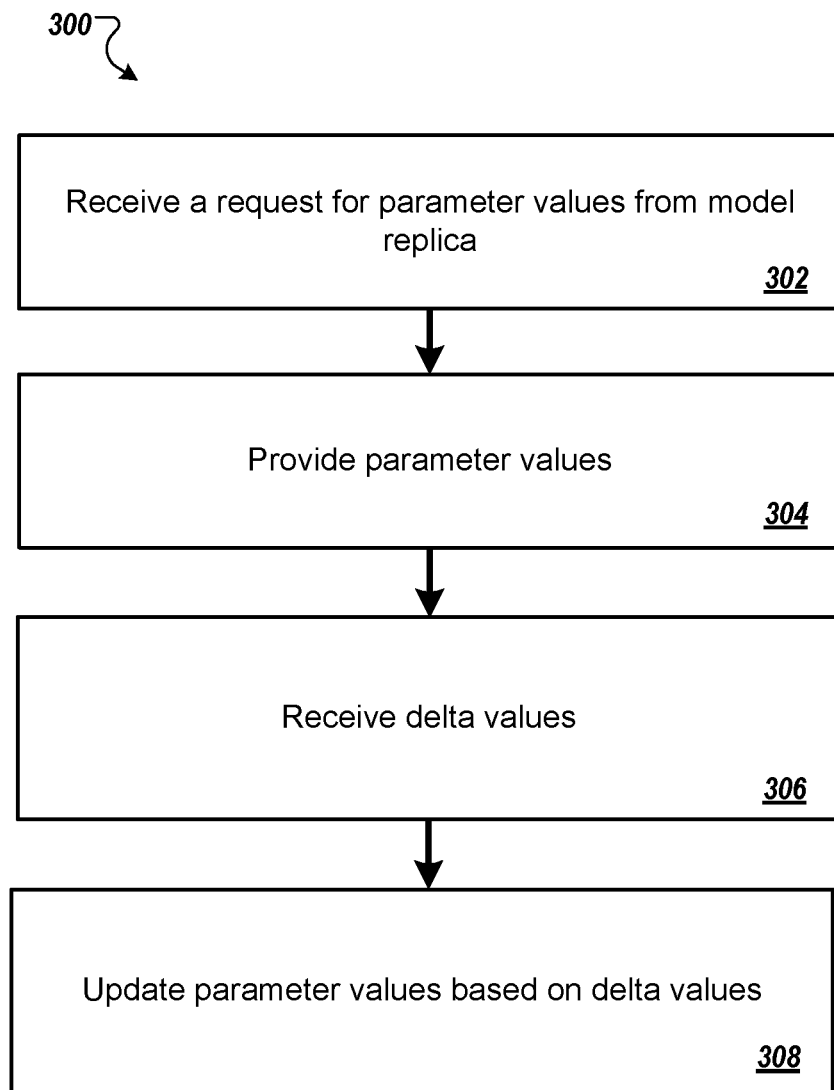
FIG. 3 is a flow diagram of an example process for training a machine learning model.

FIG. 3 is a flow diagram of an example process 300 for training a machine learning model. For convenience, the process 300 will be described as being performed by a parameter server shard, e.g., one of the parameter server shards 110 of FIG. 1, appropriately programmed.

The process 300 can be performed asynchronously by multiple shards of a parameter server, as part of a procedure for training a machine learning model. As part of the training procedure, each of the parameter server shards will generally perform the process 300 multiple times, and each may perform the process a different number of times. For example, each parameter server shard 300 may repeat the process until a termination condition is reached or the training is terminated by a system administrator, for example.

The shard receives requests for parameter values from model replicas (step 302).

In response to each request, the shard provides current values of the requested parameters to the model replica from which the request was received (step 304).

The shard receives delta values for parameters from a model replica (step 306).

The shard updates the current values of the parameters based on the delta values (step 308). In particular, the updated value of the parameters ($p_u$) can be expressed as:

$$p_u = p_c - \alpha \times \Delta p_r,$$

where $p_c$ are the currently stored values of the parameters, α is the learning rate of the model, and $\Delta p_r$ are the received delta values of the parameters. As described above, the learning rate may be either a constant rate or an adaptive learning rate that varies between parameters and may be based on the number of iterations of stochastic gradient descent that have been performed. In these implementations, prior to updating the current value of the parameter, the shard executes an adaptive learning rate procedure in order to calculate the current learning rate.

Because the model replicas and the parameter server shards each operate asynchronously from one another during the training process, model replicas may perform iterations of the stochastic gradient descent procedure using initial values of parameters that are out of date relative to the initial values used by other model replicas in performing the same iteration of the procedure. Further, at any given time, the state of the training process, i.e., the current values of the entire set of model parameters, is the union of the states of each of the parameter server shards, and may well not be a state that was ever known to any of the model replicas.

Figure 4:
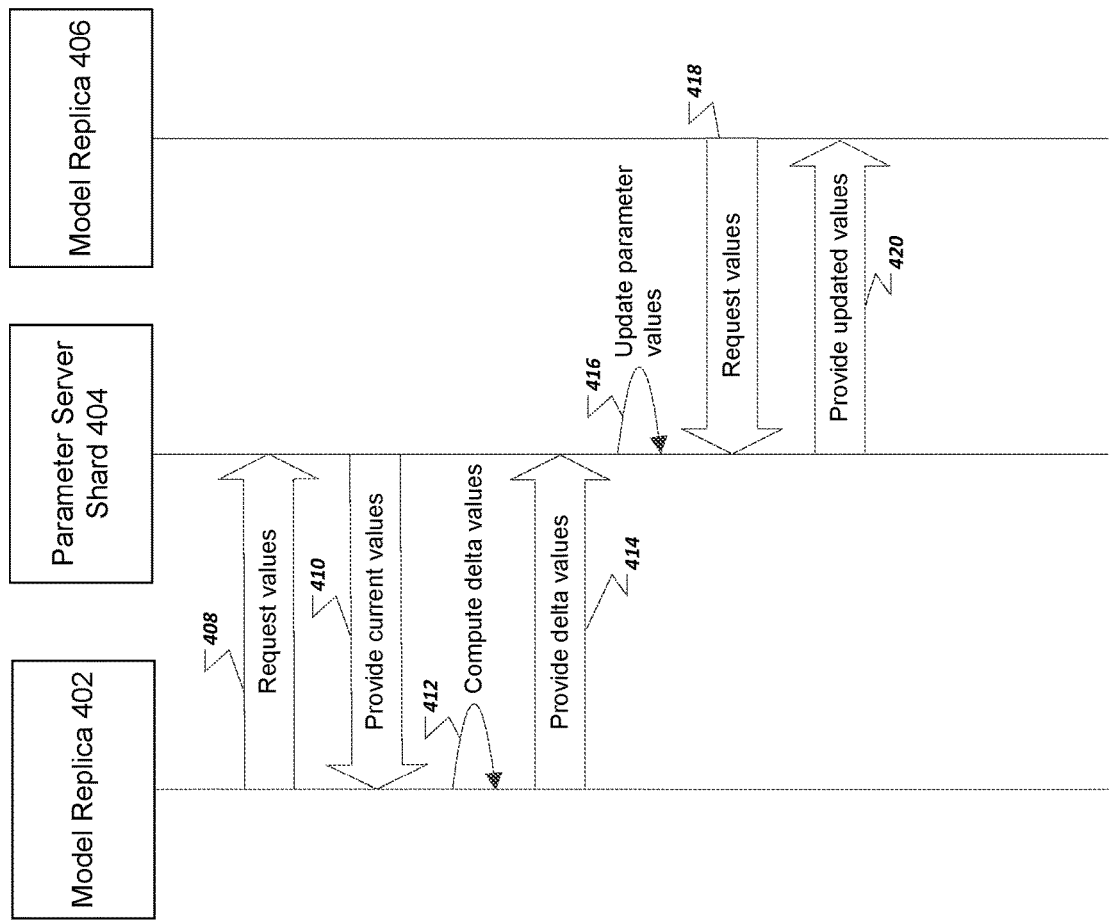
FIG. 4 is a diagram illustrating using multiple model replicas and multiple parameter server shards operating asynchronously to train a machine learning model.

FIG. 4 is a diagram illustrating using multiple model replicas and parameter server shards operating asynchronously to train a machine learning model. By way of example, model replica A 402 submits a request 408 for values of parameters to a parameter server shard 406, which is configured to maintain a subset of the parameters of the model. In response to the request 408, the parameter server shard 404 provides 410 current values of the requested parameters to model replica A 402. Model replica A 402 performs one or more iterations of model training, e.g., of the stochastic gradient descent procedure described with reference to FIG. 2, and computes 412 a delta value for each parameter of the model. Model replica A 402 then provides 414 the updated values for the subset of parameters maintained by the parameter server shard 404 to the parameter server shard 404, which uses the delta values to update 416 the current values of the parameters.

Because model replicas operate asynchronously while training the model, a different model replica B 404 may also submit a request 418 to the parameter server shard 406 for values of parameters to be used in the same iterations of the training procedure. However, because model replica B 404 is behind model replica A 402 in the training process, the parameter server 406 responds to the request by providing 420 updated values of the parameters. Thus, model replica A 402 and model replica B 404 may use different initial parameter values for performing the same iteration of the training process. Further, because parameter server shards operate asynchronously, parameter server shard 406 may have applied the computed delta values received from model replica A 402 and model replica B 404 in a different order from a different parameter server shard or may have received a different number of computed delta values than another parameter server shard.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system for training a machine learning model having parameters by determining a respective trained parameter value for each of the parameters of the machine learning model, the system comprising:
   one or more server computing units; and
   a parameter server executing on the one or more server computing units, wherein the parameter server is configured to maintain and asynchronously update values of each of the parameters of the machine learning model based on delta values received from a plurality of model replicas, wherein each model replica executes on a respective replica computing unit, wherein each of the plurality of model replicas is configured to maintain an identical instance of the machine learning model with possibly different parameter values for the parameters of the machine learning model and to operate independently of each other model replica, and wherein each model replica is further configured to asynchronously request parameter values from the parameter server, determine delta values for the parameters based on stochastic gradient descent, and provide the delta values to the parameter server.

2. The system of claim 1, wherein the system comprises the plurality of model replicas and wherein each model replica is configured to perform repeatedly the following operations:
   receive, from the parameter server, values of one or more of the plurality of parameters;
   compute respective delta values for each of the plurality of parameters by performing one or more iterations of a machine learning training process that is based on stochastic gradient descent; and
   provide, for each of the plurality of parameters, the delta value for the parameter to the parameter server.

3. The system of claim 2, wherein:
   performing one or more iterations of the machine learning training process comprises:
      obtaining a respective batch of training data; and
      computing the respective delta values for each of the plurality of parameters by computing a gradient of an objective function for training the machine learning model based on the received values and the batch of training data.

4. The system of claim 3, wherein each model replica obtains a different sequence of training data.

5. The system of claim 3, wherein each model replica obtains different training data.

6. The system of claim 1, wherein the parameter server comprises a plurality of shards that are each configured to maintain and update values of a respective partition of the model parameters, and wherein each shard is configured to perform repeatedly the following operations asynchronously with respect to every other shard:
   receive a succession of respective requests for parameter values from each of the plurality of replicas of the model;
   in response to each request, download a current value of each requested parameter to the replica from which the request was received;
   receive, from each of the plurality of replicas, a succession of uploads, each upload including respective delta values for each of the parameters in the partition maintained by the shard; and update values of the parameters in the partition maintained by the parameter server shard repeatedly based on the uploads of delta values to generate current parameter values.

7. The system of claim 6, wherein the updated value of a parameter ($p_u$) satisfies:

$$p_u = p_c - \alpha \times \Delta p_r,$$

wherein $p_c$ is a current value of the parameter, $\alpha$ is a learning rate, and $\Delta p_r$ is a received delta value for the parameter.

8. The system of claim 7, wherein the learning rate is an adaptive learning rate that varies between parameters.

9. The system of claim 7, wherein the learning rate is an adaptive learning rate that varies between iterations of the training process.

10. One or more non-transitory computer-readable storage media storing instructions that when executed by one or more computers cause the one or more computers to implement a training system for training a machine learning model having parameters by determining a respective trained parameter value for each of the parameters of the machine learning model, the training system comprising:

a parameter server executing on the one or more server computing units, wherein the parameter server is configured to maintain and asynchronously update values of each of the parameters of the machine learning model based on delta values received from a plurality of model replicas, wherein each model replica executes on a respective replica computing unit, wherein each of the plurality of model replicas is configured to maintain an identical instance of the machine learning model with possibly different parameter values for the parameters of the machine learning model and to operate independently of each other model replica, and wherein each model replica is further configured to asynchronously request parameter values from the parameter server, determine delta values for the parameters based on stochastic gradient descent, and provide the delta values to the parameter server.

11. The computer-readable storage media of claim 10, wherein the training system further comprises the model replicas and wherein each replica is configured to perform repeatedly the following operations:

receive, from the parameter server, values of one or more of the plurality of parameters;

compute respective delta values for each of the plurality of parameters by performing one or more iterations of a machine learning training process that is based on stochastic gradient descent; and provide, for each of the plurality of parameters, the delta value for the parameter to the parameter server.

12. The computer-readable storage media of claim 11, wherein:

performing one or more iterations of the machine learning training process comprises:

obtaining a respective batch of training data; and computing the respective delta values for each of the plurality of parameters by computing a gradient of an objective function for training the machine learning model based on the received values and the batch of training data.

13. The computer-readable storage media of claim 12, wherein each model replica obtains a different sequence of training data.

14. The computer-readable storage media of claim 12, wherein each model replica obtains different training data.

15. The computer-readable storage media of claim 10, wherein the parameter server comprises a plurality of shards that are each configured to maintain and update values of a respective partition of the parameters, and wherein each shard is configured to perform repeatedly the following operations asynchronously with respect to every other shard:

receive a succession of respective requests for parameter values from each of the plurality of replicas of the model;

in response to each request, download a current value of each requested parameter to the replica from which the request was received;

receive, from each of the plurality of replicas, a succession of uploads, each upload including respective delta values for each of the parameters in the partition maintained by the shard; and update values of the parameters in the partition maintained by the parameter server shard repeatedly based on the uploads of delta values to generate current parameter values.

16. The computer-readable storage media of claim 15, wherein the updated value of a parameter ($p_u$) satisfies:

$$p_u = p_c - \alpha \times \Delta p_r,$$

wherein $p_c$ is a current value of the parameter, $\alpha$ is a learning rate, and $\Delta p_c$ is a received delta value for the parameter.

* * * * *